(12) United States Patent
Yamamoto et al.

(10) Patent No.: US 6,456,582 B1
(45) Date of Patent: Sep. 24, 2002

(54) APPARATUS FOR CHUCKING A CARTRIDGE HAVING A POSITION RESTRICTING MECHANISM

(75) Inventors: Masato Yamamoto, Zama (JP); Takafumi Suwa, Tanashi (JP); Takahiro Asano, Hachiouji (JP); Atuomi Ono, Hachiouji (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/554,120
(22) PCT Filed: Sep. 2, 1999
(86) PCT No.: PCT/JP99/04764
§ 371 (c)(1), (2), (4) Date: May 10, 2000
(87) PCT Pub. No.: WO00/16326
PCT Pub. Date: Mar. 23, 2000

(30) Foreign Application Priority Data

Sep. 11, 1998 (JP) .......................................... 10-258809

(51) Int. Cl.⁷ ............................................ G11B 33/02
(52) U.S. Cl. ...................................................... 369/77.2
(58) Field of Search ............................. 369/77.2, 75.2, 369/272, 282; 360/99.06, 99.07, 133

(56) References Cited

U.S. PATENT DOCUMENTS

| | | | | |
|---|---|---|---|---|
| 4,272,794 A | * | 6/1981 | Skarky ........................ 360/133 |
| 4,509,086 A | | 4/1985 | Hickethier et al. ...... 360/99.05 |
| 4,835,639 A | * | 5/1989 | Sasaki et al. ............ 360/99.06 |
| 4,866,693 A | | 9/1989 | Odawara et al. ........... 360/75.2 |
| 4,878,139 A | * | 10/1989 | Hasegawa et al. ....... 360/99.02 |
| 4,887,174 A | | 12/1989 | Tezuka ..................... 360/99.06 |
| 5,179,484 A | * | 1/1993 | Nakajima ................. 360/99.02 |
| 5,329,504 A | * | 7/1994 | Mukawa ................... 369/13.21 |
| 6,057,995 A | * | 5/2000 | Yamashita et al. .......... 360/133 |

FOREIGN PATENT DOCUMENTS

| | | |
|---|---|---|
| EP | 0 219 415 | 4/1987 |
| EP | 0 571 227 A2 | 11/1993 |
| EP | 0 700 041 A1 | 3/1996 |
| JP | 4-318370 | 9/1992 |
| JP | 4-289573 | 10/1992 |

* cited by examiner

*Primary Examiner*—Robert S. Tupper
*Assistant Examiner*—Julie Anne Watko
(74) *Attorney, Agent, or Firm*—Eric J. Robinson; Robinson Intellectual Property Law Office PC

(57) ABSTRACT

A cartridge chucking apparatus capable of stably and correctly restricting the position of a cartridge with an improved reliability and precision. A cartridge is provided with a circle hole and an elongated hole as reference holes for restricting an in-plane position of the cartridge. The cartridge chucking apparatus has: a loading chassis having projections for holding the cartridge and restricting the position in the height direction and support shafts for supporting the loading chassis while it is raised or lowered; a base chassis having reference planes for squeezing the cartridge with the projections at a recording/reproducing position of the loading chassis to restrict the position in the height direction and positioning pins formed on the reference planes for being inserted into the reference holes to restrict an in-plane position of the cartridge; and elastic members for energizing the loading chassis so that first the positioning pin is inserted into the circle hole of the cartridge.

9 Claims, 12 Drawing Sheets

APPARATUS FOR CHUCKING A CARTRIDGE HAVING A POSITION RESTRICTING MECHANISM

BACKGROUND OF THE INVENTION

1. Field of the Invention

The present invention relates to a chucking apparatus and method for a cartridge, and more particularly to a chucking apparatus and method for restricting a position of a cartridge accommodating a storage medium and loaded in a recording/reproducing apparatus at a recording/reproducing position thereof.

2. Description of the Related Art

It is important that a cartridge accommodating a storage medium such as an optical disk and a magnetic disk should be loaded always stably in a recording/reproducing apparatus at a predetermined recording/reproducing position, in order to record/reproduce data in/from the storage medium. If a position restriction (chucking) error such as a cartridge float and a cartridge shift occurs at the predetermined recording/reproducing position, it is impossible to correctly record/reproduce data. In order to avoid this, a recording/reproducing apparatus is equipped with a cartridge chucking apparatus for loading/unloading. the cartridge at a predetermined recording/reproducing position. A conventional cartridge chucking apparatus is mounted so that when a cartridge is inserted into the recording/reproducing apparatus, the chucking apparatus holds it, and moves it to a predetermined recording/reproducing position whereat the position in the back/front, right/left and up/down directions is restricted. FIG. 10 is a perspective view of a conventional cartridge chucking apparatus adapted to an MD recording/reproducing apparatus. FIGS. 11A and 11B are diagrams illustrating the operation of the cartridge chucking apparatus shown in FIG. 10 as viewed along an arrow F direction, FIG. 11A shows the state that a cartridge is inserted, and FIG. 11B shows the state that the cartridge is fixed at a predetermined recording/reproducing position.

As shown in FIG. 10, the conventional cartridge chucking apparatus adapted to an MD recording/reproducing apparatus is mounted in a main frame (not shown) of the MD recording/reproducing apparatus and constituted of a loading chassis 80, a base chassis 90 and elastic members 3a and 3b for energizing both the base chassis 90 and loading chassis 80 so as to make them engage with each other. The loading chassis 80 holds a cartridge 1 inserted into an inlet of the MD recording/reproducing apparatus and loads it at, or unloads it from, a predetermined recording/reproducing position. The base chassis 90 restricts (chucks) the position of the cartridge 1 in the front/back, right/left and up/down directions as viewed in FIG. 10, at a loading position to which the loading chassis 80 was moved.

The cartridge 1 accommodates a storage medium (disk) and has two reference holes 2 side by side on the right side as viewed in FIG. 10. These reference holes 2 are formed on the bottom side of the cartridge as concaves with bottoms. The hole 2a is a circle hole, and the hole 2b is an elongated hole with arc sides.

The loading chassis 80 is mounted in a main frame (not shown) of the MD recording/reproducing apparatus as described above and has support shafts 84a and 84b extending from opposite sides. A lift (not shown) for raising/lowering the loading chassis 80 in the main frame is coupled to the support shafts 84a and 84b. As the loading chassis 80 is raised in the main frame, it takes a position corresponding to the inlet (not shown) into which the cartridge 1 is inserted.

The loading chassis 80 is provided with spring hooks 86a and 86b projecting from the left side and rear side of the loading chassis 80.

The base chassis 90 is fixed to the bottom of the MD recording/reproducing apparatus and positioned under the loading chassis 80 spaced by a predetermined distance therefrom. The base chassis 90 made of a thin plate has opposite side walls 91a and 91b generally bent at a right angle. The side walls 91a and 91b have guides 94a and 94b formed at generally the center portions thereof, the guides making the support shafts 84a and 84b of the loading chassis 80 be guided and fitted therein. Similar to the loading chassis 80, the base chassis 90 has spring hooks 96 and 96b projecting from the left side and rear side of the base chassis 90. On the surface of the base chassis 90, projected left reference planes 92a and 92d and projected right reference planes 92b and 92c are formed. Of these, the projected right reference planes 92b and 92c have narrow positioning pins 98c and 98b extending upward from the upper surfaces of the planes 92b and 92c. The left reference planes 92a and 92d have the same height as (is flush with) the right reference planes 92b and 92c.

The spring hooks 86a and 86b of the loading chassis 80 and the spring hooks 96a and 96b of the base chassis 90 are coupled together by the elastic members 3a and 3b and are energized by the elastic members 3a and 3b. Therefore, the elastic members 3a and 3b always energize the loading chassis 80 down to the base chassis 90.

Next, with reference to FIGS. 11A and 11B, the operation of the conventional cartridge chucking apparatus constructed as above will be described. As shown in FIG. 11A, the cartridge 1 is inserted into the inlet of the MD recording/reproducing apparatus and accommodated in the loading chassis 80. At this time, the loading chassis 90 is at the raised position, with their support shafts 84 being held by the lift (not shown). As the cartridge 1 is inserted into the loading chassis 80, this insertion state is detected with a detector (not shown) and the lift is driven to lower the loading chassis 80. The loading chassis 80 is lowered while being maintained horizontally, because the support shafts 84 are held by the lift at the center of the loading chassis 80 which is energized by the elastic members 3a and 3b at opposite ends thereof.

As the loading chassis 80 is lowered horizontally by the lift, as shown in FIG. 11B the positioning pins 98c and 98b of the base chassis 90 are inserted into the reference holes 2, i.e., circle hole 2a and elongated hole 2b of the cartridge 1, by the force of the elastic members 3 so that the position in the front/back, right/left and up/down directions can be restricted.

As described above, with the conventional cartridge chucking apparatus, the positioning pins 98c and 98b are correctly inserted into the reference holes, i.e., circle hole 2a and elongated hole 2b, to fix the cartridge 1, while the loading chassis 80 holding the cartridge 1 is maintained horizontal by the force of the elastic members 3.

With the conventional cartridge chucking apparatus, however, if the cartridge 1 inserted into the loading chassis 80 and temporarily aligned in position shifts in the loading chassis 80 (shift in front/back and right/left directions, rotation and the like) by external shocks such as vibrations, the positioning pins 98c and 98b cannot be inserted into the reference holes 2 even the force of the elastic members 3 is applied.

In order to solve this problem, techniques have been developed which utilize the principle of lever to allow the cartridge 1 to be fitted in with a relatively small force. Such techniques are described, for example, in JP-A-HEI-4-319370.

FIG. 12 is a perspective view of a cartridge chucking apparatus utilizing the principle of lever and adapted to a conventional cartridge recording/reproducing apparatus. FIGS. 13A to 13C are diagrams illustrating the operation of the cartridge chucking apparatus shown in FIG. 12 as viewed along an arrow G direction. FIG. 13A shows the state that a cartridge is inserted, FIG. 13B shows the state that the cartridge is lowered, and FIG. 13C shows the state that the position of the cartridge is restricted and the cartridge is set at a predetermined recording/reproducing position.

As shown in FIG. 12, the conventional cartridge chucking apparatus adapted to a cartridge recording/reproducing apparatus is mounted in a main frame (not shown) of the cartridge recording/reproducing apparatus and constituted of a loading chassis 110, a base chassis 120 and elastic members 3a and 3b for energizing both the base chassis 110 and loading chassis 120 so as to make them engage with each other. The loading chassis 110 holds a cartridge 100 inserted into an inlet of the cartridge recording/reproducing apparatus and loads it at, or unloads it from, a predetermined recording/reproducing position. The base chassis 120 restricts the position of the cartridge 100 in the front/back, right/left and up/down directions as viewed in FIG. 12, at a loading position to which the loading chassis 110 was moved.

The cartridge 100 accommodates a storage medium (disk) and has two reference holes 102 at adjacent front corners as viewed in FIG. 12. These reference holes 102 are formed on the bottom side of the cartridge as concaves with bottoms. The hole 102a is a circle hole, and the hole 102b is an elongated hole with arc sides.

The loading chassis 110 is mounted in a main frame (not shown) of the cartridge recording/reproducing apparatus as described above and has support shafts 114a and 114b extending from opposite sides. A lift (not shown) for raising/lowering the loading chassis 110 in the main frame is coupled to the support shafts 114a and 114b. As the loading chassis 110 is raised in the main frame, it takes a position corresponding to the inlet (not shown) into which the cartridge 100 is inserted. The loading chassis 110 is provided with spring hooks 16a and 16b projecting from the left side and rear side of the loading chassis 110.

The base chassis 120 is fixed to the bottom of the cartridge recording/reproducing apparatus and positioned under the loading chassis 110 spaced by a predetermined distance therefrom. The base chassis 120 made of a thin plate has opposite side walls 121a and 121b generally bent at a right angle. The side walls 121a and 121b have guides 124a and 124b formed generally at the center portions thereof, the guides making the support shafts 114a and 114b of the loading chassis 110 be guided and fitted therein. Similar to the loading chassis 110, the base chassis 120 has spring hooks 126a and 126b projecting from the left side and rear side of the base chassis 120. On the surface of the base chassis 120, projected back reference planes 122a and 122b and projected front reference planes 122b and 122d are formed. Of these, the projected front reference planes 122a and 122c have narrow positioning pins 128a and 128c extending upward from the upper surfaces of the planes 122a and 122c.

The front reference planes 122a and 122c are slightly higher than the back reference planes 122b and 122d. A height difference between the front reference planes 122a and 122c and the back reference planes 122b and 122d is set to about 0.5 mm. This is because a dimensional tolerance (allowable distortion) of the surface of an ordinary cartridge is in a range of 0.3 mm or smaller, and if this allowable error is covered, the cartridge can be set reliably.

The spring hooks 116a and 116b of the loading chassis 110 and the spring hooks 126a and 126b of the base chassis 120 are coupled together by the elastic members 3a and 3b and are energized by the elastic members 3a and 3b. Therefore, the elastic members 3a and 3b always energize the loading chassis 110 down to the base chassis 120.

Next, with reference to FIGS. 13A to 13C, the operation of the conventional cartridge chucking apparatus constructed as above will be described. As shown in FIG. 13A, the cartridge 100 is inserted into the inlet of the cartridge recording/reproducing apparatus and accommodated in the loading chassis 110. At this time, the loading chassis 90 is at the raised position, with their support shafts 84 being held by the lift. As the cartridge 100 is inserted into the loading chassis 110, this insertion state is detected with a detector (not shown) and the lift is driven to lower the loading chassis 110.

In this case, the loading chassis 110 is lowered while being maintained horizontally, because the support shafts 114a and 114b are held by the lift at the centers of the loading chassis 110 which is energized by the elastic members 3a and 3b at opposite ends thereof, as shown in FIG. 13B.

As the loading chassis 100 is lowered horizontally by the lift, as shown in FIG. 13C the back reference planes 122b and 122d higher than the front reference planes 122a and 122c abut upon the back surface of the cartridge 100, before the positioning pins 128 are inserted into the reference holes 102 or before they are inserted into the reference holes 102 and a load is applied thereto. Therefore, because of the lever principle using the back reference planes 122b and 122d as fulcrum points and the positioning pins 128 as the load points, the cartridge 100 can be set reliably to the predetermined recording/reproducing position, without any suspension of the cartridge 100 at the intermediate points of the positioning pins 128 or inclination of the cartridge 100.

As described above, the conventional cartridge chucking apparatus restricts the position of a cartridge in the front/back, right/left and up/down directions, by effectively utilizing the reference planes for restricting the position in a height direction (up/down direction), the positioning pins for restricting the position in the front/back and right/left directions by inserting them into the cartridge reference holes, and the elastic members for energizing the loading chassis and base chassis in the height direction.

With the conventional cartridge chucking apparatus, the cartridge abuts upon the back side (back reference planes) of the base chassis for temporary position alignment. Therefore, if the cartridge temporarily aligned in position is shifted (shift in front/back and right/left direction, rotation and the like) by external shocks such as vibrations, it becomes difficult for the positioning pins to be inserted into the reference holes, and also the position alignment precision and its reliability of the cartridge change with the operation performance of the lift.

Furthermore, with the conventional cartridge chucking apparatus, two positioning pins are inserted into the two reference holes (circle hole and elongated hole) at the same time by one operation. Therefore, if, for example, the positioning pin is inserted into the circle hole faster than the elongated hole, because of external shocks such as vibrations, the cartridge is fixed and becomes hard to be moved because of the friction of the inserted pin with the hole, and in addition, the position of the circle hole is displaced and the positioning pin becomes difficult to be inserted.

Still further, with the conventional cartridge chucking apparatus, the cartridge is supported at four positions including two front reference planes and two back planes, or two right reference planes and two left reference planes. Therefore, the abut surface of a cartridge is required to have high flatness. If the abut surface is uneven, the height reference may be made slanted when the position is restricted so that the cartridge is set with some play or a spindle motor and the like for rotating a disk is required to have a high rotation precision and a high deviation precision.

SUMMARY OF THE INVENTION

It is an object of the present invention to solve the above-described problems and provide a chucking apparatus capable of correctly and stably restricting the position of a cartridge and improving a reliability and precision of position alignment.

In order to solve the above-described problems, the present invention provides a chucking apparatus for loading/unloading a cartridge accommodating a storage medium into/from a recording/reproducing apparatus, the cartridge having a circle hole and an elongate hole as reference holes in front and rear along an insertion direction of the cartridge, the reference holes restricting a position in horizontal direction of the cartridge, the chucking apparatus comprising: a loading chassis disposed in the recording/reproducing apparatus, the loading chassis including projections in contact with upper surface of the cartridge for holding the cartridge and for restricting a position in height direction of the cartridge and support members projecting from opposite sides of the loading chassis and supported by a lifting mechanism; a base chassis disposed in the recording/reproducing apparatus, the base chassis including reference planes in contact with bottom surfaces of the cartridge including the reference holes at a predetermined recording/reproducing position to which the loading chassis is moved, to squeeze the cartridge with the projections and restrict the position in height direction of the cartridge, and positioning pins projecting from surfaces of the reference planes for entering the reference holes and having in contact with the bottom surfaces of the reference holes to restrict the position in horizontal direction of the cartridge; and a loading mechanism adapted to insert the positioning pin into the circle hole and thereafter insert the other positioning pin into the elongated hole.

Preferably, the chucking apparatus further comprises elastic members engaged between the loading chassis and the base chassis, wherein the loading mechanism is arranged so that the positioning pin is first inserted into the circle hole and thereafter the other positioning pin is inserted into the elongated hole owing to the balance of the elastic member in front and rear of the support member as a fulcrum.

It is preferable to use a coil spring as the elastic member.

Further, as a preferable embodiment, the loading chassis includes a plurality of support members disposed in front and rear along the insertion direction and the loading mechanism has a slider having a guide groove for determining the position in height direction of the support member when loading engaged with the support member.

And, the guide groove of the slider consists of a slope groove part and upper and lower horizontal groove parts sandwiching the slope groove part, and the guide groove is arranged so that the support member at the circle hole side of the loading chassis moves to the slope groove part of the guide groove prior to the movement of the support member at the elongated hole side when the cartridge moves from the insertion position to the reproduction position.

And also, the guide groove consists of a slope groove part and upper and lower horizontal glove parts sandwiching the slope groove part, and an angle of the slope groove part of the guide groove with respect to a horizontal plane is set us so that an angle of the slope at the circle hole side is larger than an angle of the slope at the elongated hole.

The present invention provides a chucking method for loading a cartridge accommodating a storage medium into a recording/reproducing apparatus, the cartridge having a circle hole an elongate hole as reference holes in front and rear along an insertion direction of the cartridge, the reference holes restricting a position in horizontal direction of the cartridge, the chucking method comprising the steps of: inserting the cartridge into a loading chassis positioned in a horizontal plane; causing the loading chassis holding the cartridge to move to a position for recording/reproducing so obliquely that the circle hole side of the cartridge becomes lower than the longate hole thereof; and positioning horizontally the loading chassis holding the cartridge in the position for recording/reproducing.

DETAILED DESCRIPTION OF THE PREFERRED EMBODIMENTS

Figure 1:
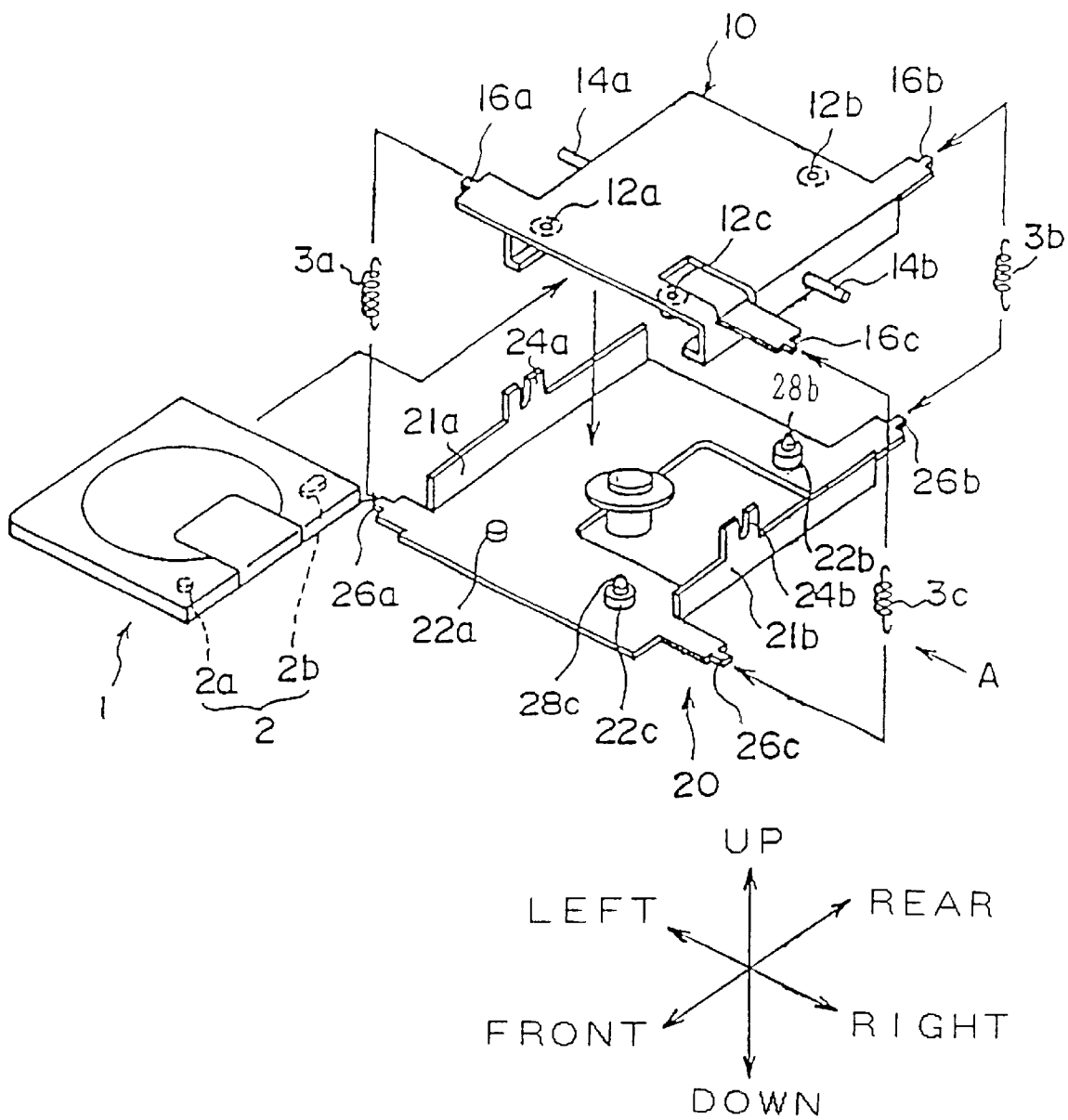
FIG. 1 is a perspective view of a cartridge chucking apparatus adapted to an MD recording/reproducing apparatus, according to a first embodiment of the invention.
Figure 2A:
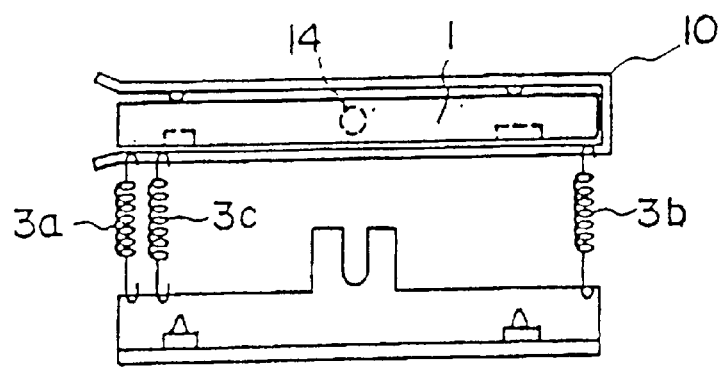
FIGS. 2A to 2C are diagrams illustrating the operation of the cartridge chucking apparatus shown in FIG. 1 as viewed along an arrow A direction.
Figure 2B:
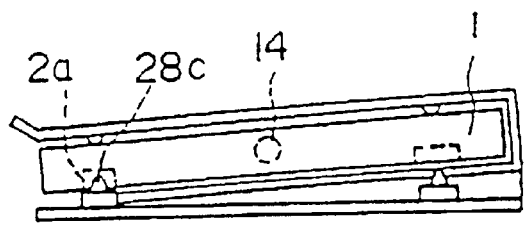
Figure 2C:
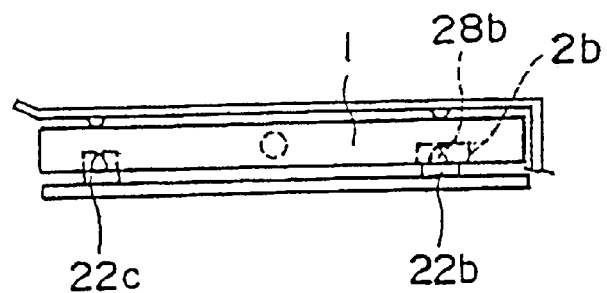

Embodiments of a cartridge chucking apparatus of this invention will be detailed with reference to the accompanying drawings. FIG. 1 is a perspective view of a cartridge chucking apparatus adapted to an MD recording/ reproducing apparatus, according to a first embodiment of the invention. FIGS. 2A to 2C are diagrams illustrating the operation of the cartridge chucking apparatus shown in FIG. 1 as viewed along an arrow A direction, FIG. 1A shows the state that a cartridge is inserted, FIG. 2B shows the state that a positioning pin 28c is inserted into a circle hole 2a, and FIG. 2C shows the state that the cartridge is aligned in position at a predetermined recording/reproducing position.

As shown in FIG. 1, the cartridge chucking apparatus adapted to an MD recording/reproducing apparatus according to the first embodiment of the invention, is constituted of a loading chassis 10, a base chassis 20 and elastic members 3a, 3b and 3c for energizing both the base chassis 20 and loading chassis 10 so as to make them engage with each other. The loading chassis 10 holds a cartridge 1 inserted into an inlet of an MD recording/reproducing apparatus (not shown) and loads it at, or unloads it from, a predetermined recording/reproducing position. The base chassis 20 restricts (chucks) the position of the cartridge 1 in the front/back, right/left and up/down directions as viewed in FIG. 1, at a loading position to which the loading chassis 10 was moved.

The cartridge 1 accommodates a storage medium (disk) and has two reference holes 2 disposed side by side on the right side as viewed in FIG. 1. These reference holes 2 are formed on the bottom side of the cartridge as concaves with bottoms. The hole 2a is a circle hole, and the hole 2b is an elongated hole with arc sides.

The loading chassis 10 has support shafts 14a and 14b extending from opposite sides. A lift (not shown) for raising/lowering the loading chassis 10 in the main frame (not shown) of the MD recording/reproducing apparatus is coupled to the support shafts 14a and 14b. The loading chassis 10 is therefore mounted movably by the lift in the main frame of the MD recording/reproducing apparatus. As the loading chassis 10 is raised in the main frame, it takes a position corresponding to the inlet (not shown) of the MD recording/reproducing apparatus into which the cartridge 1 is inserted. The loading chassis 10 is provided with spring hooks 16a, 16b and 16c projecting from the opposite sides and rear side of the loading chassis 10. There are a plurality of projections 12 projecting downward from the inner surface of the loading chassis 10, two right projections 12b and 12c and one left projection 12a.

The base chassis 20 is fixed to the bottom of the MD recording/reproducing apparatus and positioned under the loading chassis 10 spaced by a predetermined distance therefrom. The base chassis 20 made of a thin plate has opposite side walls 21a and 21b generally bent at a right angle. The side walls 21a and 21b have guides 24a and 24b formed generally at the center portions thereof, the guides making the support shafts 14a and 14b of the loading chassis 10 be guided up and down and fitted therein. Similar to the loading chassis 10, the base chassis 20 has spring hooks 26a, 26b and 26c projecting from the both opposite sides and rear side of the base chassis 20.

On the surface of the base chassis 20, two projected right reference planes 22b and 22c and one projected left reference plane 22a are formed, similar to the projections 22 of the loading chassis 10. Of these, the projected right reference planes 22b and 22c have narrow positioning pins 28b and 28c extending upward from the upper surfaces of the planes 22b and 22c. The right reference planes 22b and 22c have the same height as (are flush with) the front reference plane 22a.

One ends of elastic members 3a, 3b and 3c are connected to the spring hooks 16a, 16b and 16c at the both sides and rear side of the loading chassis 10, and the other ends of the elastic members 3a, 3b and 3c are connected to the spring hooks 26a, 26b and 26c of the base chassis 20. The elastic members 3a and 3c energize the front portion of the loading chassis 10, whereas the elastic member 3b energizes the back portion of the loading chassis 10, respectively about the support shafts 14a and 14b. Therefore, as the loading chassis 10 lowers, first the positioning pin 28c is inserted into the front circle hole 2a of the cartridge 1.

In this embodiment, although the cartridge 1 has the circle hole 2a on the front side, there is another type of a cartridge which has the circle hole on the back side. In this case, the elastic members 3a, 3b and 3c are adjusted or disposed differently so that the back side (opposite to the inlet) is applied with a larger force to slant the cartridge first on the back side.

Next, with reference to FIGS. 2A to 2C, the operation of the cartridge chucking apparatus of the first embodiment constructed as above will be described in detail. As shown in FIG. 2A, the cartridge 1 is inserted into the inlet of the MD recording/reproducing apparatus and accommodated in the loading chassis 10. At this time, the loading chassis 10 is at the raised position, with their support shafts 14 being held by the lift. As the cartridge 1 is inserted into the loading chassis 10, this insertion state is detected with a detector (not shown) and the lift is driven to lower the loading chassis 10.

In this case, as described above, the loading chassis 10 is energized by the elastic members 3a and 3c on one side and by the elastic member 3b on the other side, respectively about the support shafts 14. Therefore, the loading chassis 10 is lowered while being slanted toward the elastic members 3a and 3b side having a larger elastic force and rotating about the support shafts 14. Therefore, as shown in FIG. 2B the positioning pin 28c is first inserted into the circle hole 2a having an smaller opening area among the two holes of the cartridge 1 formed on the right side.

Thereafter, as the loading chassis 10 is further lowered by the lift, as shown in FIG. 2C the positioning pin 28b is inserted into the elongated hole 2b, and the bottom surface of the cartridge 1 abuts upon the reference planes 22a and 22b to complete the position alignment or restriction (chucking).

According to the first embodiment, as shown in FIGS. 2A to 2C, the position of the circle hole 2a of the cartridge 1 is first restricted and then the position of the elongated hole 2b is restricted. Since the circle hole 2a is first fixed, it is possible to prevent rotation (of the cartridge) about the elongated hole 2b and prevent any play in the position alignment. By efficiently utilizing the elastic members 3a, 3b and 3c which supplement the lift operation, the position restriction can be performed reliably.

Figure 3:
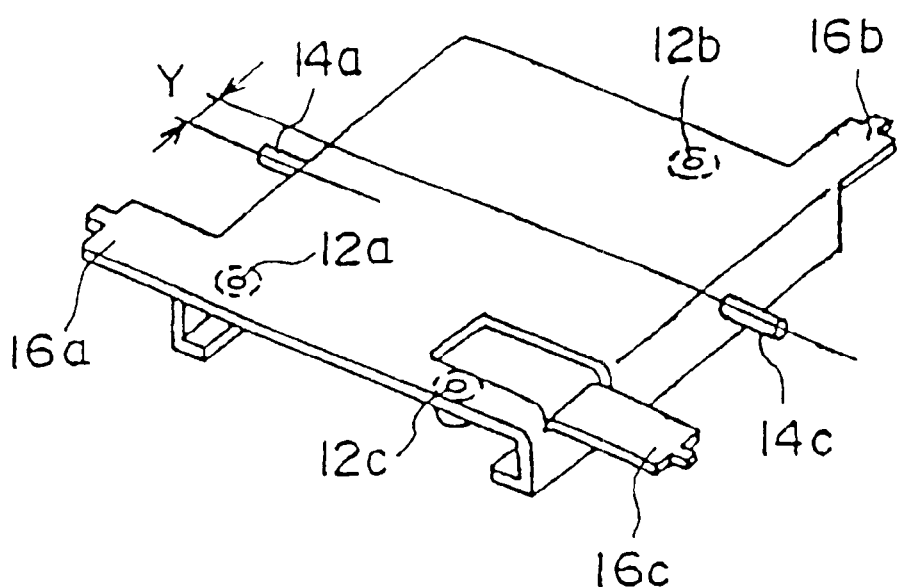
FIG. 3 is a perspective view showing another embodiment of the loading chassis shown in FIG. 1.
Figure 4:
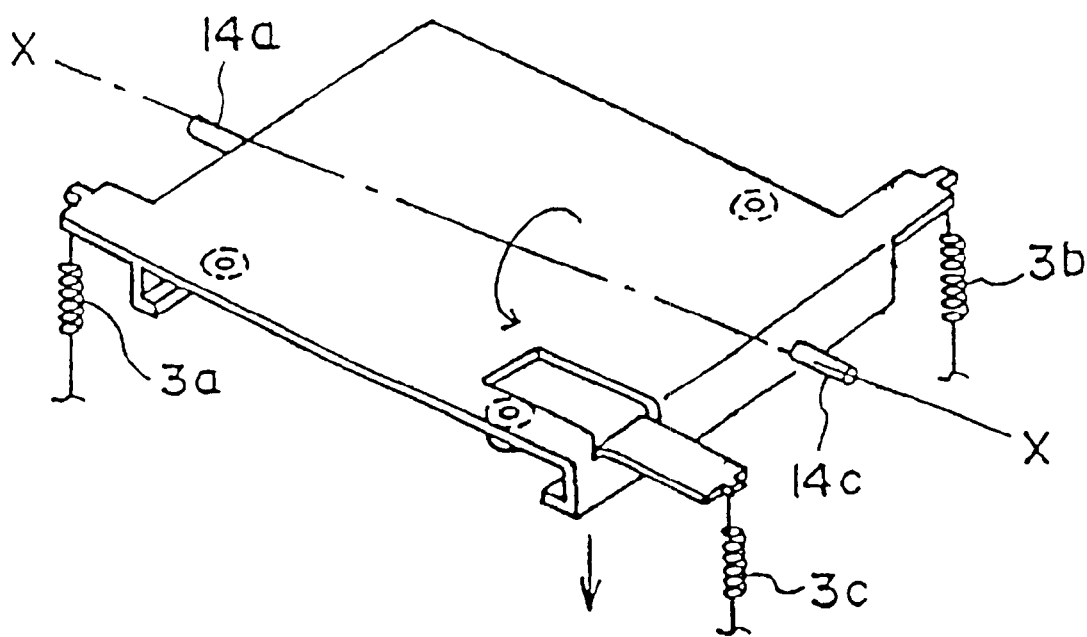
FIG. 4 is a perspective view illustrating the operation of the loading chassis shown in FIG. 4.

In the first embodiment, as shown in FIG. 1, although the support shafts 14a and 14b are provided symmetrically extending from opposite sides, they may be provided asymmetrically with similar effects being expected. FIG. 3 is a perspective view showing another embodiment of the loading chassis shown in FIG. 1. FIG. 4 is a perspective view illustrating the operation of the loading chassis shown in FIG. 3. In this embodiment of the loading chassis shown in FIG. 3, the support shaft 14b of the first embodiment is displaced by a distance Y as shown in FIG. 3 and is used as a support shaft 14c. The other structures are the same as those of the first embodiment, like elements to those shown in FIG. 1 are represented by identical reference numerals, and the duplicate description is omitted.

As shown in FIG. 3, the loading chassis of this embodiment has support shafts 14a and 14c projecting from the opposite sides. As different from the support shafts 14a and 14b shown in FIG. 1, in this embodiment, the support shaft 14c is displaced to the back side by a distance Y from the support shaft 14a as shown in FIG. 3. This distance Y is preferably set to about 5 mm or longer.

Similar to the loading chassis 10 shown in FIG. 1, the loading chassis of this embodiment has spring hooks 16a, 16b and 16c projecting from the opposite sides and rear side, and there are a plurality of projections 12 projecting downward from the inner surface of the loading chassis, two right projections 12c and 12d and one left projection 12a.

As shown in FIG. 4, the loading chassis of this embodiment slants toward the elastic members 3a and 3c side having a larger elastic force, rotating about line X-X interconnecting the support shafts 14a and 14c. In this case, since the support shaft 14c is displaced backward by the distance Y from the support shaft 14a, the loading chassis slants greatly on the elastic member 3c side. The circle hole (on the elastic member 3c side) of the cartridge 1 accommodated in the loading chassis lowers first, then the elastic member 3a side shown in FIG. 4 lowers, and lastly the elongated hole 2b (elastic member 3b side) lowers. The position restriction is performed in this manner.

According to the cartridge chucking apparatus of the first embodiment of the invention, the position of the circle hole of the cartridge is first restricted to prevent rotation of the cartridge. Accordingly, a friction resistance during the position restriction lowers and the position restriction operation can be realized more reliably and smoothly than conventional techniques.

Furthermore, since a reliable and smooth position restriction operation is possible, a user can set the position of a cartridge at a predetermined recording/reproducing position by merely inserting a cartridge. It is possible to prevent a position restriction error to be caused by suspension of a cartridge at the intermediate points of the positioning pins or inclination of the cartridge, and reliably set the cartridge at the predetermined recording/reproducing position.

Still further, it is not necessary to restrict the positions of two reference holes at the same time by one operation as in conventional techniques. It is possible to sequentially restrict (chuck) the positions of the circle hole and elongate hole with smaller force. The cartridge 1 is fixed by being squeezed between the reference planes 22a, 22b and 22c of the base chassis and the projections 12a, 12b and 12c of the loading chassis 10 and also energized by the elastic members 3a, 3b and 3c. Therefore, a position restriction state without any dimensional play can be realized.

Figure 5:
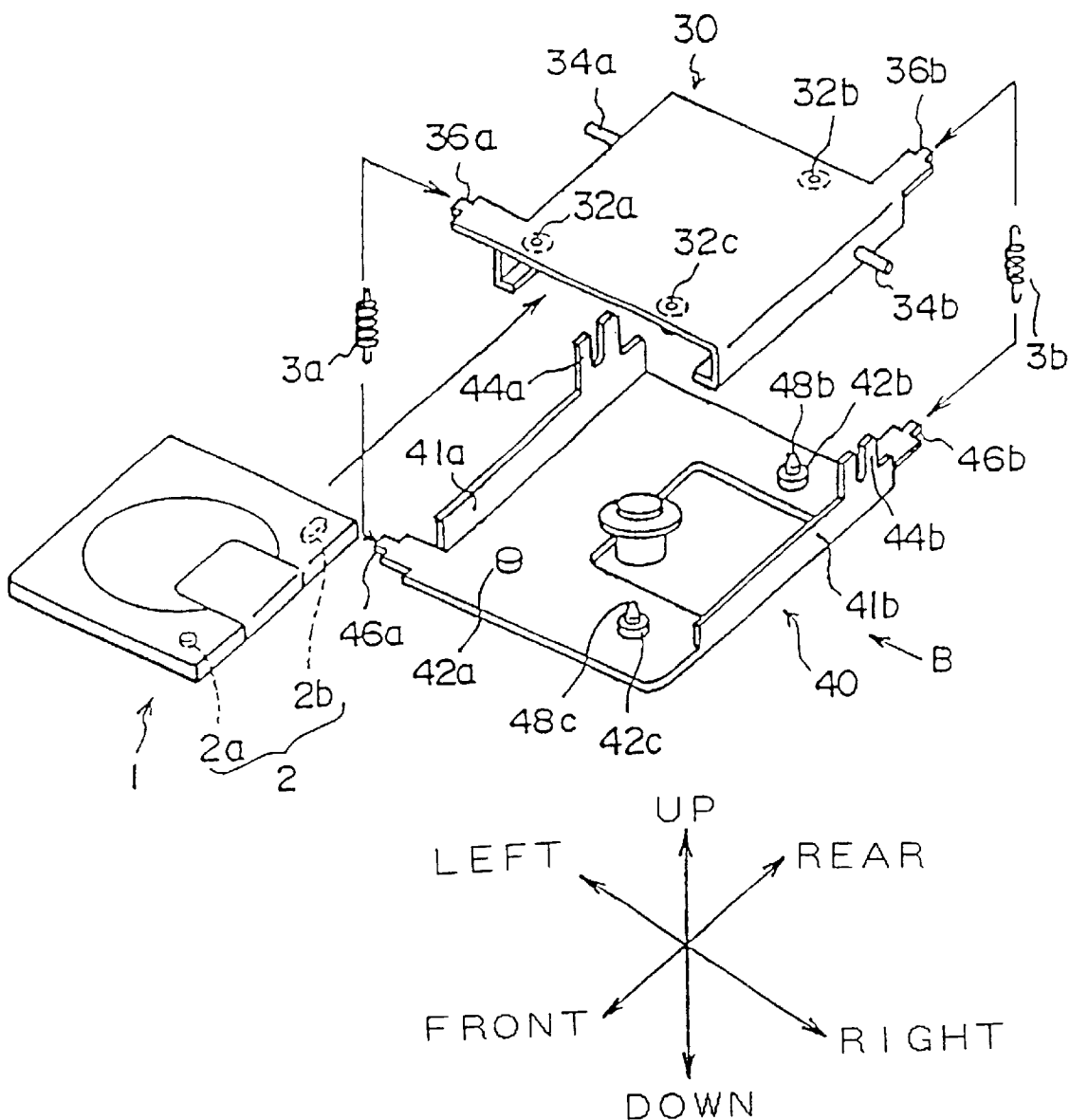
FIG. 5 is a perspective view of a cartridge chucking apparatus adapted to an MD recording/reproducing apparatus, according to a second embodiment of the invention.
Figure 6A:
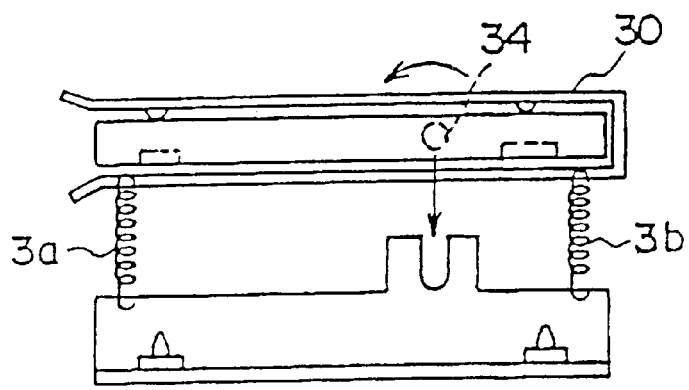
FIGS. 6A to 6C are diagrams illustrating the operation of the cartridge chucking apparatus shown in FIG. 5 as viewed along an arrow B direction.
Figure 6B:
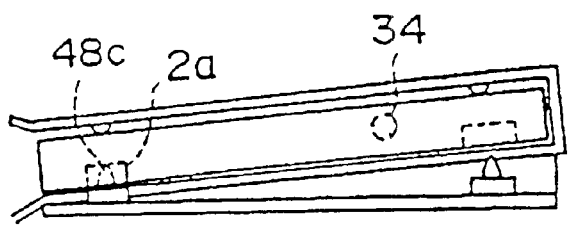
Figure 6C:
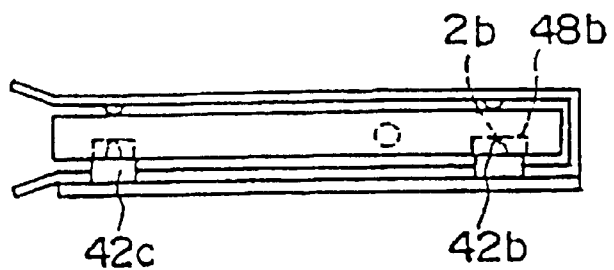

Next, a cartridge chucking apparatus according to the second embodiment of this invention will be detailed with reference to FIG. 5. FIG. 5 is a perspective view of the cartridge chucking apparatus adapted to an MD recording/reproducing apparatus, according to the second embodiment of the invention. FIGS. 6A to 6C are diagrams illustrating the operation of the cartridge chucking apparatus shown in FIG. 5 as viewed along an arrow B direction, FIG. 6A shows the state that a cartridge is inserted, FIG. 6B shows the state that a positioning pin 48c is inserted into a circle hole 2a, and FIG. 6C shows the state that the cartridge is aligned in position at a predetermined recording/reproducing position.

As shown in FIG. 5, the cartridge chucking apparatus adapted to an MD recording/reproducing apparatus according to the second embodiment of the invention, is constituted of a loading chassis 30, a base chassis 40 and elastic members 3a and 3b for energizing both the base chassis 40 and loading chassis 30 so as to make them engage with each other. The loading chassis 30 holds a cartridge 1 inserted into an inlet of an MD recording/reproducing apparatus (not shown) and loads it at, or unloads it from, a predetermined recording/reproducing position. The base chassis 40 restricts (chucks) the position of the cartridge 1 in the front/back, right/left and up/down directions as viewed in FIG. 5, at a loading position to which the loading chassis 30 was moved.

The cartridge 1 accommodates a storage medium (disk) and has two reference holes 2 disposed side by side on the right side as viewed in FIG. 5. These reference holes 2 are formed on the bottom side of the cartridge as concaves with bottoms. The hole 2a is a circle hole, and the hole 2b is an elongated hole with arc sides.

The loading chassis 30 has support shafts 34a and 34b extending from opposite sides. As different from the first embodiment, the support shafts 34a and 34b are shifted to the back side from the centers of the loading chassis 30. A lift (not shown) for raising/lowering the loading chassis 30 in the main frame (not shown) of the MD recording/reproducing apparatus is coupled to the support shafts 34a and 34b. The loading chassis 30 is therefore mounted movably by the lift in the main frame of the MD recording/reproducing apparatus. As the loading chassis 30 is raised in the main frame, it takes a position corresponding to the inlet (not shown) of the MD recording/reproducing apparatus into which the cartridge 1 is inserted.

The loading chassis 30 is provided with spring hooks 36a and 36b projecting from the left side and rear side of the loading chassis 30. There are a plurality of projections 32 projecting downward from the inner surface of the loading chassis 30, two right projections 32b and 32c and one left projection 32a.

The base chassis 40 is fixed to the bottom of the MD recording/reproducing apparatus and positioned under the loading chassis 30 spaced by a predetermined distance therefrom. The base chassis 40 made of a thin plate has opposite side walls 41a and 41b generally bent at a right angle. The side walls 41a and 41b have guides 44a and 44b formed generally at the back portions thereof, the guides making the support shafts 34a and 34b of the loading chassis 30 be guided and fitted therein. Similar to the loading chassis 30, the base chassis 40 has spring hooks 46a and 46b projecting from the left side and rear side of the base chassis 40.

On the surface of the base chassis 40, two projected right reference planes 42b and 42c and one projected left reference plane 22a are formed, similar to the projections 32 of the loading chassis 30. Of these, the projected right reference planes 42b and 42c have narrow positioning pins 48b and 48c extending upward from the upper surfaces of the planes 42b and 42c. The right reference planes 42b and 42c have the same height as (are flush with) the front reference plane 42a.

One ends of elastic members 3a and 3b are connected to the spring hooks 46a and 46b at the left. side and rear side of the loading chassis 30, and the other ends of the elastic members 3 and 3b are connected to the spring hooks 46a and 46b of the base chassis 40. The elastic member 3a energizes the front portion of the loading chassis 30, whereas the elastic member 3b energizes the back portion of the loading chassis 30, respectively about the support shafts 34a and 34b. Since the support shafts 34a and 34b of the loading chassis 30 are shifted to the back side from the center, the lever ratio changes and the front portion of the loading chassis 30 on the elastic member 3a side first flowers.

In this embodiment, although the cartridge 1 shown in FIG. 5 has the circle hole 2a on the front side, there is another type of a cartridge which has the circle hole on the back side. In this case, the guides 44a and 44b and support shafts 34a and 34b are formed on the front side.

Next, with reference to FIGS. 6A to 6C, the operation of the cartridge chucking apparatus of the second embodiment constructed as above will be described in detail. As shown in FIG. 6A, the cartridge 1 is inserted into the inlet of the MD recording/reproducing apparatus and accommodated in the loading chassis 30. At this time, the loading chassis 30 is at the raised position, with their support shafts 34 being held by the lift. As the cartridge 1 is inserted into the loading chassis 30, this insertion state is detected with a detector (not shown) and the lift is driven to lower the loading chassis 30.

In this case, as described above, the loading chassis 30 is energized by the elastic members 3a and 3c, with the support shafts 34 being shifted to the back side from the center. Therefore, as shown in FIG. 6B, the loading chassis 30 is lowered while being slanted toward the elastic member 3a side having a longer distance to the support shaft 34. Therefore, the positioning pin 48c is first inserted into the circle hole 2a having an smaller opening area among the two reference holes 2 of the cartridge 1 formed on the right side, similar to the loading chassis shown in FIG. 1.

Thereafter, as the loading chassis 30 is further lowered by the lift, as shown in FIG. 6C the positioning pin 48b is inserted into the elongated hole 2b, and the bottom surface of the cartridge 1 abuts upon the reference planes 42 to complete the position alignment or restriction (chucking).

According to the second embodiment of the cartridge chucking apparatus, the positioning pin 48c is first inserted into the circle hole 2a when the cartridge 1 is aligned in position, similar to the first embodiment. Similar effects of the first embodiment can therefore be obtained. Furthermore, since one elastic member can be omitted, the number of components can be reduced.

Figure 7:
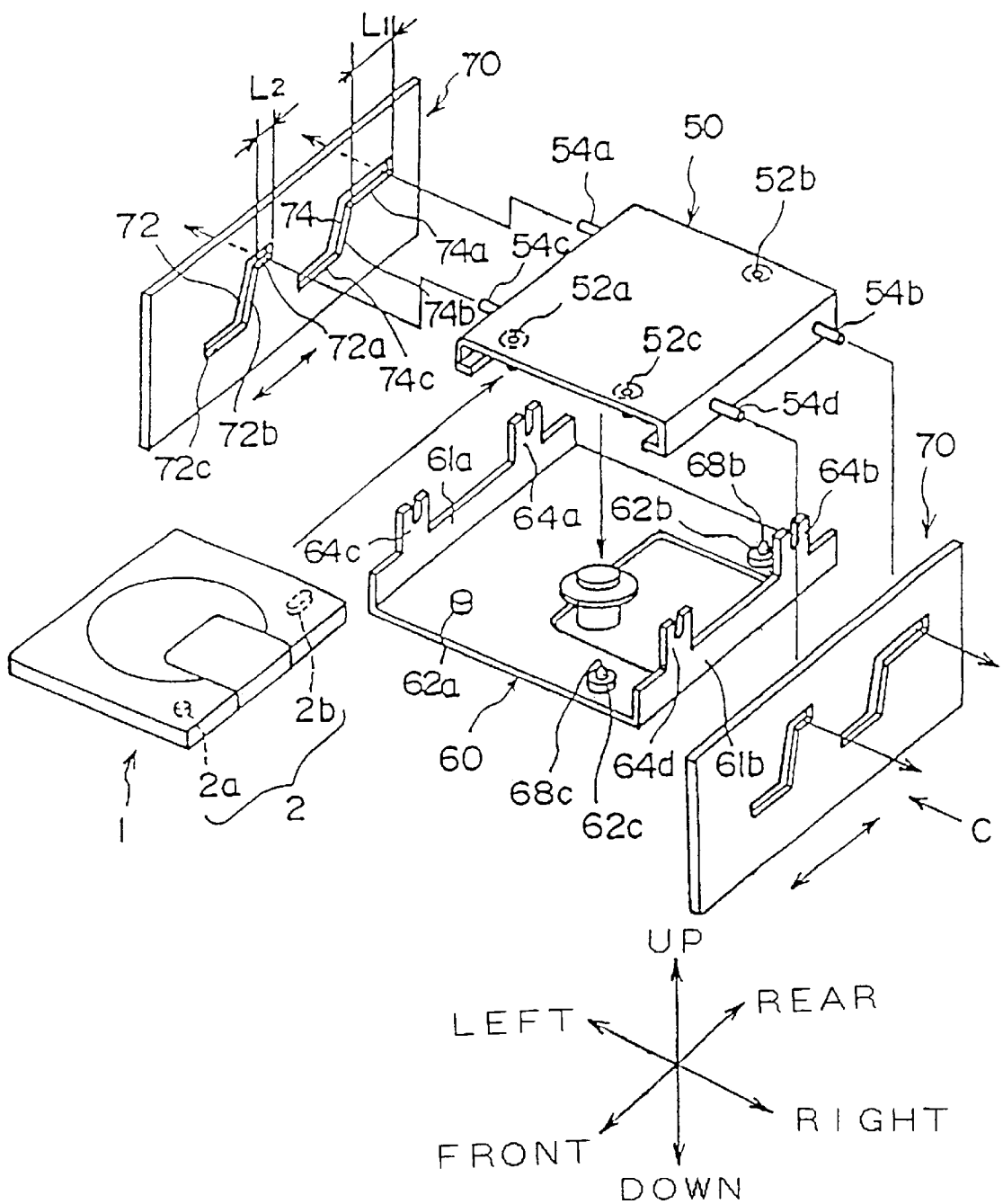
FIG. 7 is a perspective view of a cartridge chucking apparatus adapted to an MD recording/reproducing apparatus, according to a third embodiment of the invention.
Figure 8A:
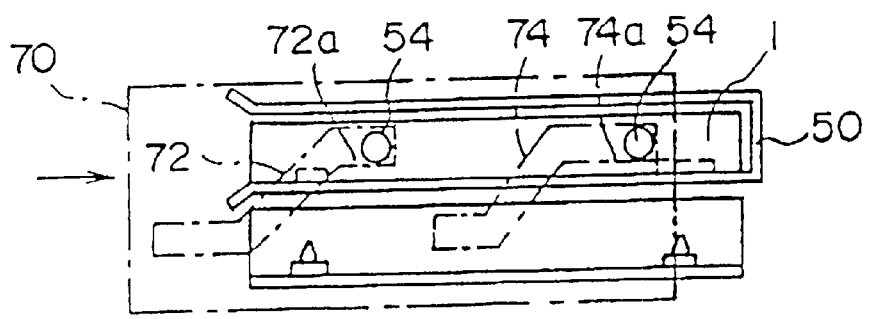
FIGS. 8A to 8C are diagrams illustrating the operation of the cartridge chucking apparatus shown in FIG. 7 as viewed along an arrow C direction.
Figure 8B:
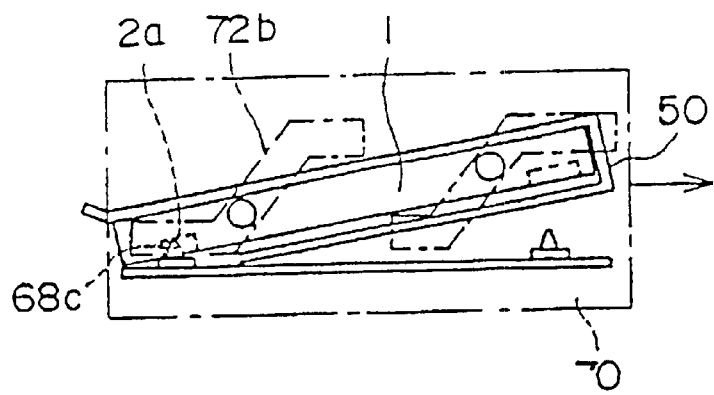
Figure 8C:
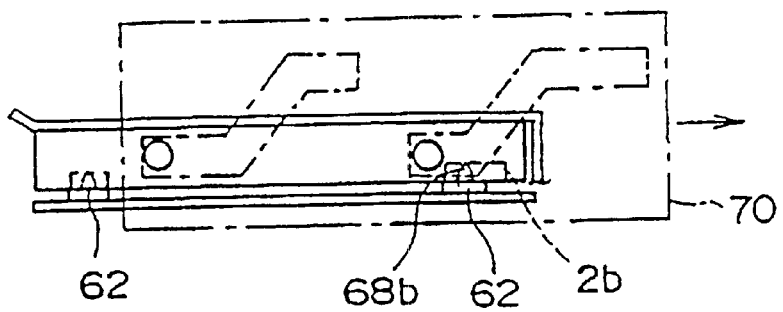

Next, a cartridge chucking apparatus according to the third embodiment of this invention will be detailed with reference to FIG. 7. FIG. 7 is a perspective view of the cartridge chucking apparatus adapted to an MD recording/reproducing apparatus, according to the third embodiment of the invention. FIGS. 8A to 8C are diagrams illustrating the operation of the cartridge chucking apparatus shown in FIG. 7 as viewed along an arrow C direction, FIG. 8A shows the state that a cartridge is inserted, FIG. 8B shows the state that a positioning pin 62c is inserted into a circle hole 2a, and FIG. 8C shows the state that the cartridge is aligned in position at a predetermined recording/reproducing position.

As shown in FIG. 7, the cartridge chucking apparatus adapted to an MD recording/reproducing apparatus according to the third embodiment of the invention, is constituted of a loading chassis 50, a base chassis 60 and sliders 70a and 70b. The loading chassis 50 holds a cartridge 1 inserted into an inlet of an MD recording/reproducing apparatus (not shown) and loads it at, or unloads it from, a predetermined recording/reproducing position. The base chassis 60 restricts (chucks) the position of the cartridge 1 in the front/back, right/left and up/down directions as viewed in FIG. 7, at a loading position to which the loading chassis 50 was moved. The sliders 70a and 70b are moved by a driver (not shown) and guides the loading chassis 50 to a predetermined recording/reproducing position of the base chassis 50.

The cartridge 1 accommodates a storage medium (disk) and has two reference holes 2 disposed side by side on the right side as viewed in FIG. 7. These reference holes 2 are formed on the bottom side of the cartridge as concaves with bottoms. The hole 2a is a circle hole, and the hole 2b is an elongated hole with arc sides.

The loading chassis 50 is mounted movably in the main frame of the MD apparatus, and has support shafts 54a, 54b, 54c and 34d extending from opposite sides, as different from the first and second embodiments. As the loading chassis 50 is raised in the main frame, it takes the position near at the inlet (not shown) of the MD recording/reproducing apparatus in which the cartridge 1 is inserted. There are a plurality of projections 52 projecting downward from the inner surface of the loading chassis 50, two right projections 52b and 52c and one left projection 52a.

The base chassis 60 is fixed to the bottom of the MD recording/reproducing apparatus and positioned under the loading chassis 50 spaced by a predetermined distance therefrom. The base chassis 60 made of a thin plate has opposite side walls 61a and 61b generally bent at a right angle. The side walls 61a and 61b have guides 64a, 64b, 64c and 64d for making the support shafts 54 of the loading chassis 50 be guided up and down and fitted therein.

On the surface of the base chassis 60, two projected right reference planes 62b and 62c and one projected left reference plane 62a are formed, similar to the projections 52 of the loading chassis 50. Of these, the projected right reference planes 62b and 62c have narrow positioning pins 68b and 68c extending upward from the upper surfaces of the planes 62b and 62c. The right reference planes 62b and 62c have the same height as (are flush with) the front reference plane 62a.

The loading chassis 50 has the sliders 70a and 70b made of a rectangular thin plate which support the loading chassis 50 by inserting the four support shafts 54 projecting at both sides into front and back guide grooves 72 and 74 formed in the sliders 70a and 70b. The sliders 70 are made movable back and forth by a driver (not shown) along opposite sides of the loading chassis 50. The front and back guide grooves 72 and 74 are constituted of upper horizontal grooves 72a and 74a, lower horizontal grooves 72c and 74c, and slanted grooves 72b and 74a having a predetermined slope angle and interconnecting the upper and lower horizontal grooves.

The length $L_1$ of the upper groove 74a of the back guide groove 74 is set longer than the length $L_2$ of the upper groove 72a of the front guide groove 72. As the sliders 70 move back and forth, the support shafts 54 of the loading chassis 50 are guided by the front and back guide grooves 72 and 74 so that the loading chassis 50 can be moved to the predetermined recording/reproducing position of the base chassis 60, similar to the first and second embodiments.

Although the cartridge 1 shown in FIG. 7 has the circle hole 2a on the front side, there is another type of a cartridge which has the circle hole on the back side. In this case, the front and back guide grooves 72 and 74 of the slider 70 are reversed (the lengths $L_1$ and $L_2$ are reversed).

Figure 9:
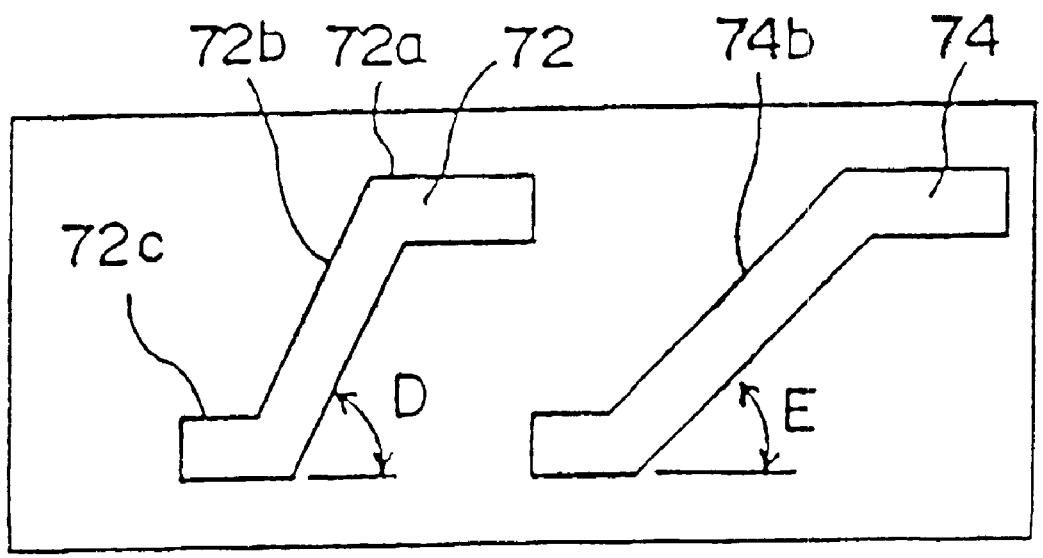
FIG. 9 is a front view of the slider shown in FIG. 7, with an adjusted slope angle of a slanted groove.
Figure 10:
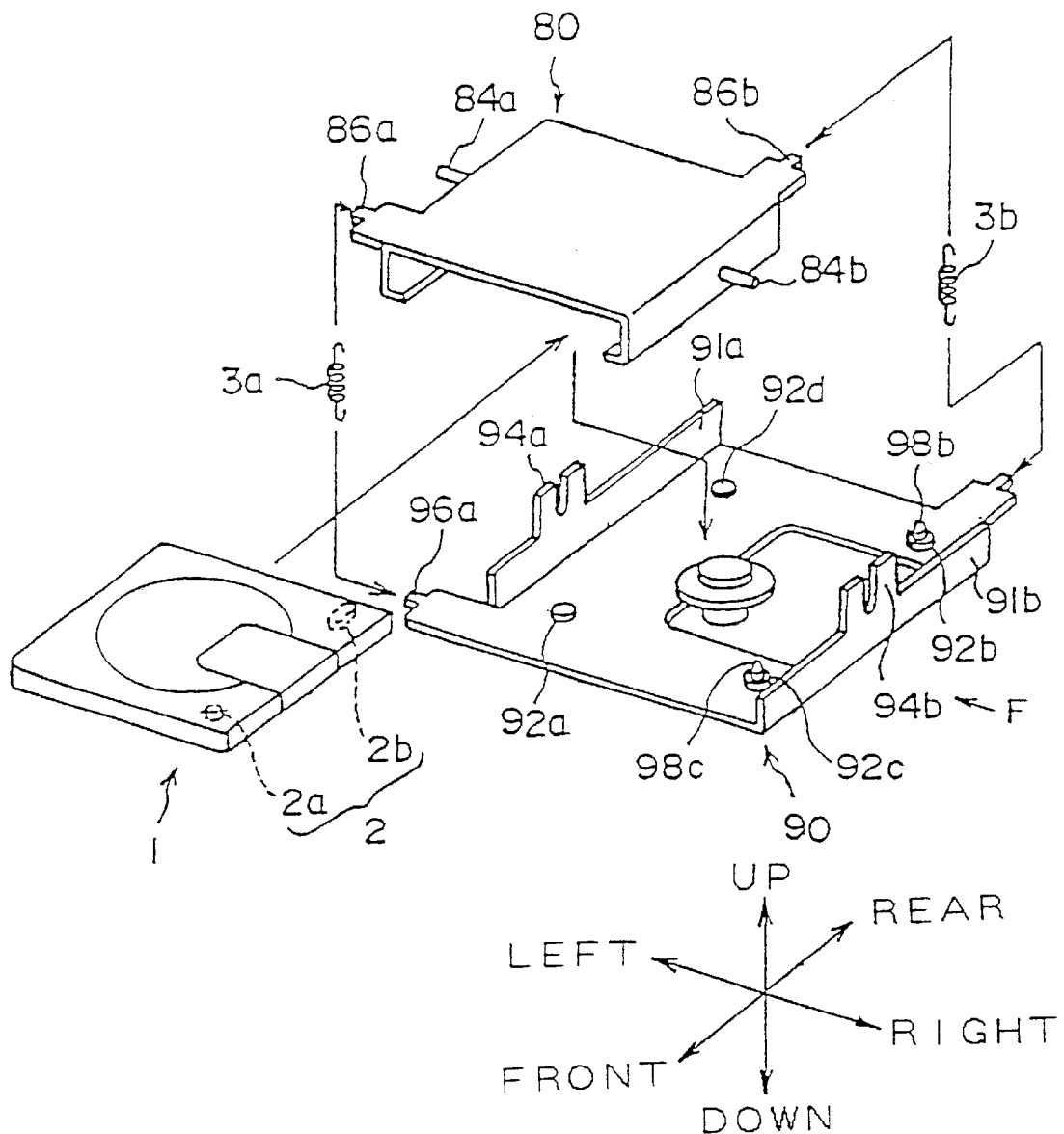
FIG. 10 is a perspective view of a conventional cartridge chucking apparatus.
Figure 11A:
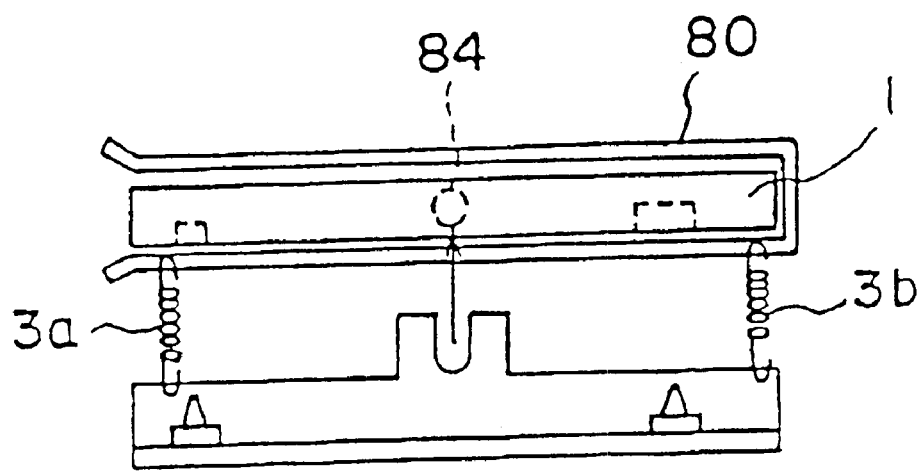
FIGS. 11A and 11B are diagrams illustrating the operation of the cartridge chucking apparatus shown in FIG. 10 as viewed along an arrow F direction.
Figure 11B:
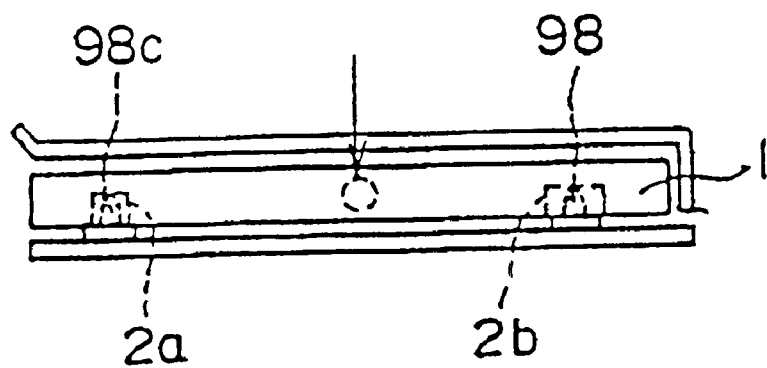
Figure 12:
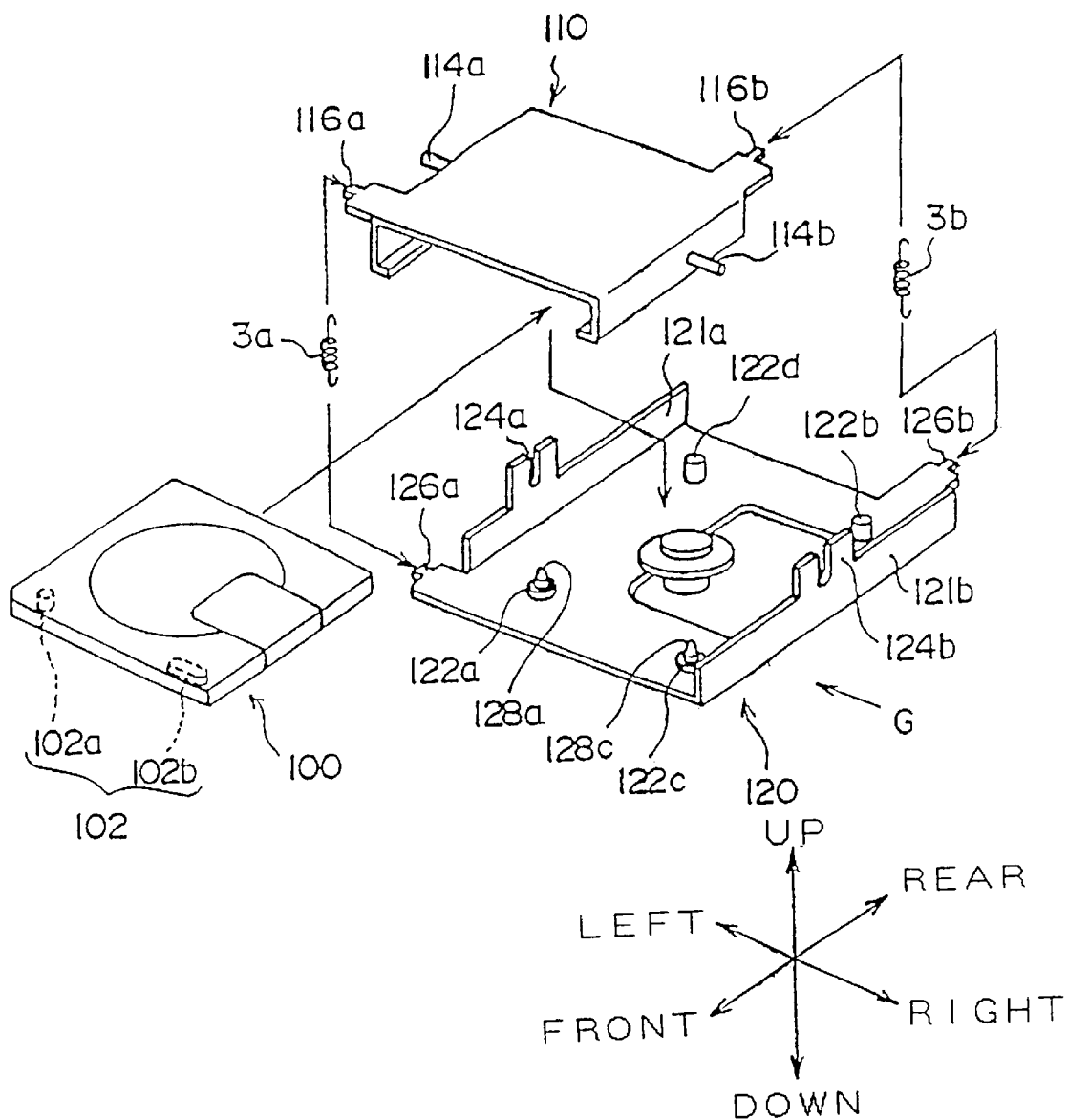
FIG. 12 is a perspective view showing another example of a conventional cartridge chucking apparatus.
Figure 13A:
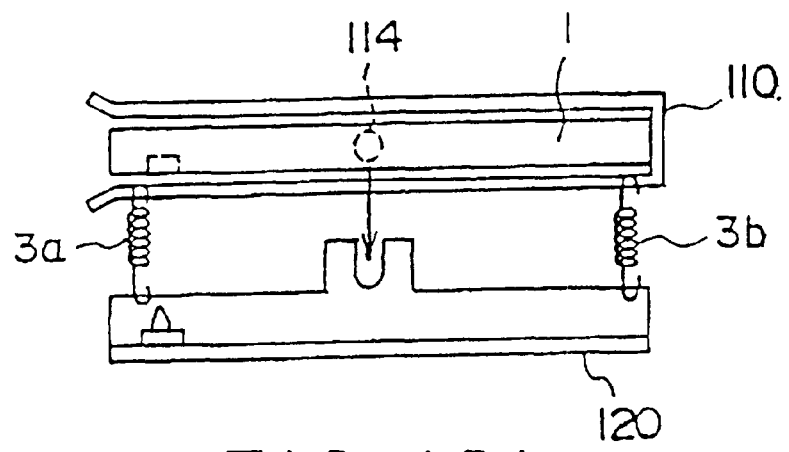
FIGS. 13A to 13C are diagrams illustrating the operation of the cartridge chucking apparatus shown in FIG. 12 as viewed along an arrow G direction.
Figure 13B:
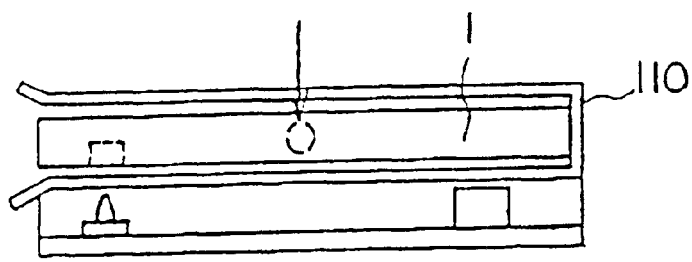
Figure 13C:
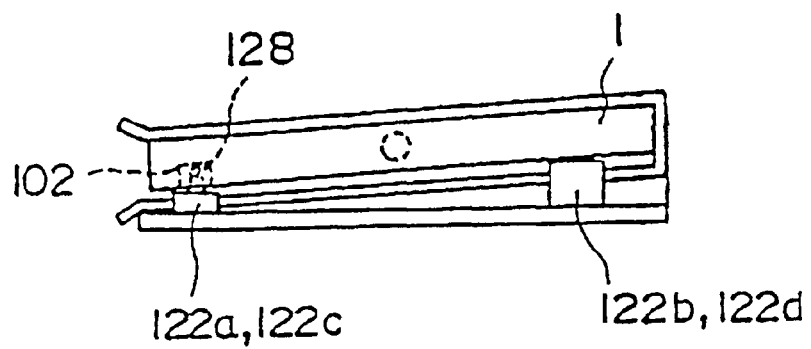

In this embodiment, although the slope angles of the slanted grooves 72b and 74b of the front and back guide grooves 72 of the slider 70 are the same, the slope angles of the slanted grooves may be made different to realize a smoother position restriction operation. FIG. 9 is a front view of a slider 70 having different slope angles of the slanted grooves 72b and 74b.

As shown in FIG. 9, the slider 70 has a slope angle D of the slanted groove 72b and a slope angle E of the slanted groove 74b, the slope angles D and E being set different with the slope angle D being larger then the slope angle E. The support shaft 54 (refer to FIG. 7) inserted into the upper groove 72a lowers to the lower groove 72c via the slanted groove 72b having the steep slope angle D in a shorter time, whereas the support shaft 54 inserted into the upper groove 74a lowers to the lower groove 74c via the slanted groove 74b having the gentle steep slope angle E in a longer time. With the lengths $L_1$ and $L_2$ shown in FIG. 7 and the different slope angles D and E shown in FIG. 9 being set to the slider 70, a smoother position restriction operation becomes possible.

Next, with reference to FIGS. 8A to 8C, the operation of the cartridge chucking apparatus of the third embodiment constructed as above will be described in detail. As shown in FIG. 8A, the cartridge 1 is inserted into the inlet of the MD recording/reproducing apparatus and accommodated in the loading chassis 50. At this time, the loading chassis 50 is at the raised position, with their support shafts 54 being held by the sliders 70. As the cartridge 1 is inserted into the loading chassis 50, this insertion state is detected with a detector (not shown) and the sliders are driven and moved along an arrow direction shown in FIG. 8A. The loading chassis 50 is moves downward being guided by the front and back guide grooves 72 and 74 of the sliders 70.

As described above, the front and back guide grooves 72 and 74 of the sliders 70 has the upper grooves 72a and 74a having different lengths. The shafts 54c and 54d inserted into the upper grooves 72a having the shorter length $L_2$ lowers along the slanted grooves 72b faster than the back support shafts 54a and 54b, as shown in FIG. 8B. Therefore, similar to the loading chassis shown in FIG. 1, the positioning pin 68c is first inserted into the circle hole 2a having an smaller opening area.

Thereafter, as the loading chassis 50 is further lowered by the sliders 70, as shown in FIG. 8C the positioning pin 68b is inserted into the elongated hole 2b, and the bottom surface of the cartridge 1 abuts upon the reference planes 62 to complete the position restriction.

According to the third embodiment of the cartridge chucking apparatus of this invention, the positioning pin 68c is first inserted into the circle hole 2a when the cartridge 1 is aligned in position. Similar effects of the first and second embodiments can therefore be obtained. Furthermore, since the raising/lowering operation of the loading chassis can be set freely by changing the shape of the guide grooves of the sliders into which the support shafts are inserted, the structure of components can be simplified and the manufacture cost can be reduced.

The invention has been described in connection with the above preferred embodiments of the cartridge chucking apparatus. The invention is not limited only to the above embodiments, but various modification are possible without departing from the scope of the appended claims.

For example, in the third embodiment, although the four support shafts 54a, 54b, 54c and 54d protruding from the sides of the loading chassis 50 and supported by the sliders 70 are used, the support shaft 54a or 54b not on the side of the positioning pins 68b and 68c may be omitted to support the loading chassis by three support shafts.

As described so far, according to the cartridge chucking apparatus of this invention, the positioning pin is first inserted into the circle hole of the cartridge, and then the other positioning pin is inserted into the elongated hole. Accordingly, the position restriction operation can be performed reliably with a small force, a high reliability and precision of the position restriction can be obtained with a simple structure, and the manufacture cost can be reduced.

Further, according to the cartridge chucking apparatus of this invention, the positioning pins are inserted into the circle and elongated holes at different timings. Accordingly, a position restriction structure easy to be used by a user can be realized, and it is possible to prevent a loading error such as a cartridge float and a cartridge shift.

Still further, according to the cartridge chucking apparatus of this invention, the cartridge is are supported and squeezed at least at three positions by the reference planes and projections. Accordingly, the position in the height direction can be reliably restricted, and a variation in flatness of cartridges can be covered at a larger degree of freedom than the conventional structure of supporting the cartridge at four positions.

What is claimed is:

1. A chucking apparatus for loading/unloading a cartridge accommodating a storage medium into/from a recording/reproducing apparatus, the cartridge having a circle hole and an elongate hole as reference holes in front and rear along an insertion direction of the cartridge, the reference holes restricting a position in horizontal direction of the cartridge, the chucking apparatus comprising:

a loading chassis disposed in the recording/reproducing apparatus, the loading chassis including projections in contact with an upper surface of the cartridge for holding the cartridge and for restricting a position in height direction of the cartridge and support members projecting from opposite sides of the loading chassis and supported by a lifting mechanism;

a base chassis disposed in the recording/reproducing apparatus, the base chassis including reference planes in contact with bottom surfaces of the cartridge including the reference holes at a predetermined recording/reproducing position to which the loading chassis is moved, to squeeze the cartridge with the projections and restrict the position in height direction of the cartridge and positioning pins projecting from surfaces of the reference planes for entering the reference holes and having in contact with the bottom surfaces of the reference holes to restrict the position in horizontal direction of the cartridge; and a loading mechanism adapted to insert a first one of said positioning pins into the circle hole and thereafter insert a second one of said positioning pins into the elongated hole.

2. The chucking apparatus according to claim 1, further comprises elastic members engaged between the loading chassis and the base chassis, wherein the loading mechanism is arranged so that the positioning pin is first inserted into the circle hole and thereafter the other positioning pin is inserted into the elongated hole by adjusting the balance of the elastic members in front and rear of the support members as fulcrums.

3. The chucking apparatus according to claim 2, wherein a coil spring is used as the elastic member.

4. The chucking apparatus according to claim 1, further comprises elastic members engaged between the loading chassis and the base chassis, wherein the loading mechanism is arranged so that the positioning pin is first inserted into the circle hole and thereafter the other positioning pin is inserted into the elongated hole by offsetting a fulcrum of at least either one of the support members from a center of gravity of the loading chassis.

5. The chucking apparats according to claim 1, wherein the loading chassis includes a plurality of support members disposed in front and rear along the insertion direction and the loading mechanism has a slider having a guide groove for determining a position in a height direction of the support member when loading engaged with the support member.

6. The chucking apparatus according to claim 5, wherein said guide groove is one of a plurality of guide grooves, wherein each of said guide grooves of the slider consists of a slope groove part and upper and lower horizontal groove parts sandwiching the slope groove part, and a first one of said guide grooves is arranged so that a first one of said support members at a circle hole side of the loading chassis moves to the slope groove part of said first one of guide grooves prior to a movement of the support member at an elongated hole side to the slope groove part of a second one of said guide grooves when the cartridge moves from an insertion position to a reproduction position.

7. The chucking apparatus according to claim 5, wherein each guide groove consists of a slope groove part and upper and lower horizontal groove parts sandwiching the slope groove part, and an angle of the slope groove part of each guide groove with respect to a horizontal plane is set up so that an angle of the slope of said first one of said guide grooves at the circle hole side is larger than an angle of the slope of said second one of said guide grooves at the elongated hole.

8. The chucking apparatus according to any of claim 5–7, wherein the slider is driven in a forth and back direction by a predetermined driving means.

9. The chucking apparatus according to any of claims 1–7, wherein the base chassis has three reference planes restricting a position of said cartridge in height direction on the base chassis.

* * * * *